US012491723B2

(12) United States Patent
Murayama

(10) Patent No.: US 12,491,723 B2
(45) **Date of Patent: *Dec. 9, 2025**

(54) PRINTING APPARATUS AND PRINT CASSETTE

(71) Applicant: BROTHER KOGYO KABUSHIKI KAISHA, Nagoya (JP)

(72) Inventor: Kentaro Murayama, Kasugai (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 4 days.

This patent is subject to a terminal disclaimer.

(21) Appl. No.: 17/706,476

(22) Filed: Mar. 28, 2022

(65) Prior Publication Data

US 2022/0219468 A1 Jul. 14, 2022

Related U.S. Application Data

(63) Continuation of application No. PCT/JP2020/034864, filed on Sep. 15, 2020.

(30) Foreign Application Priority Data

Sep. 30, 2019 (JP) ................................ 2019-178912

(51) Int. Cl.
*B41J 15/04* (2006.01)

(52) U.S. Cl.
CPC .................................. *B41J 15/044* (2013.01)

(58) Field of Classification Search
None
See application file for complete search history.

(56) References Cited

U.S. PATENT DOCUMENTS 3,639,697 A * 2/1972 Koguma ............. G11B 15/615 242/338.1
3,672,603 A 6/1972 Swain
3,804,227 A 4/1974 Cappotto et al.
3,823,808 A 7/1974 Murata et al.

(Continued)

FOREIGN PATENT DOCUMENTS

CN 1252357 A 5/2000
CN 1313197 A 9/2001

(Continued)

OTHER PUBLICATIONS

International Search Report for PCT/JP2020/034864 dated Nov. 17, 2020.

(Continued)

*Primary Examiner* — Alejandro Valencia
(74) *Attorney, Agent, or Firm* — KENEALY VAIDYA LLP

(57) ABSTRACT

A printing apparatus includes a printing apparatus main body, and a print cassette attachable to and detachable from the printing apparatus main body. The print cassette includes a roll of a first tape, a supply spool rotatable about a rotation axis, a second tape wound around the supply spool and used for printing or protecting of the first tape, an output gear to output a driving force outside, an input spool rotatable about a rotation axis. The supply spool, the output gear, and the roll are disposed in order of the supply spool, the output gear, and the roll in the axial direction of the rotation axis of the supply spool.

21 Claims, 13 Drawing Sheets

(56) References Cited

U.S. PATENT DOCUMENTS

| | | | |
|---|---|---|---|
| 3,948,382 | A | 4/1976 | Nesbitt et al. |
| 4,034,935 | A | 7/1977 | Plaza et al. |
| 4,252,450 | A | 2/1981 | Goodman et al. |
| 4,351,619 | A | 9/1982 | Duke et al. |
| 4,397,574 | A | 8/1983 | Wojdyla |
| 4,402,619 | A | 9/1983 | Paque et al. |
| 4,490,059 | A | 12/1984 | Daughters |
| 4,499,513 | A | 2/1985 | Umeda |
| 4,538,931 | A | 9/1985 | Nagashima |
| 4,565,128 | A | 1/1986 | Moriyama et al. |
| 4,598,780 | A | 7/1986 | Iwasaki et al. |
| 4,668,961 | A | 5/1987 | Hiramatsu |
| 4,832,514 | A | 5/1989 | Basile |
| 4,856,921 | A | 8/1989 | Hatakeyama |
| 5,099,378 | A | 3/1992 | Turgeon |
| 5,145,268 | A | 9/1992 | Cavallini |
| 5,325,114 | A | 6/1994 | Fogle et al. |
| 5,402,954 | A | 4/1995 | Skavnak et al. |
| 5,435,657 | A | 7/1995 | Pearce et al. |
| 5,472,286 | A | 12/1995 | Uemura et al. |
| 5,595,447 | A | 1/1997 | Takayama et al. |
| 5,619,244 | A | 4/1997 | Manna |
| 5,645,360 | A | 7/1997 | Iwane et al. |
| 5,713,677 | A | 2/1998 | Petoskey |
| 5,788,387 | A | 8/1998 | Takayama et al. |
| 5,917,532 | A | 6/1999 | Cornell et al. |
| 5,959,652 | A | 9/1999 | Privin |
| 6,042,280 | A | 3/2000 | Yamaguchi et al. |
| 6,126,344 | A | 10/2000 | Takayama et al. |
| 6,132,120 | A | 10/2000 | Yamaguchi et al. |
| 6,135,657 | A | 10/2000 | Martinez et al. |
| 6,190,067 | B1 | 2/2001 | Kobayashi et al. |
| 6,386,774 | B1 | 5/2002 | Takayama et al. |
| 6,511,238 | B1 | 1/2003 | Glize |
| 8,162,553 | B2 | 4/2012 | Vandermeulen |
| 9,566,808 | B2 * | 2/2017 | Yamaguchi ............ B41J 3/4075 |
| 11,840,069 | B2 * | 12/2023 | Ukai ........................ B41J 15/04 |
| 2002/0012558 | A1 | 1/2002 | Huss et al. |
| 2002/0067943 | A1 | 6/2002 | Furuya et al. |
| 2004/0031875 | A1 | 2/2004 | Nonomura |
| 2004/0056143 | A1 | 3/2004 | Nonomura |
| 2004/0161278 | A1 | 8/2004 | Harada |
| 2005/0031393 | A1 | 2/2005 | Kishi et al. |
| 2006/0146081 | A1 | 7/2006 | Vandermeulen et al. |
| 2006/0165461 | A1 | 7/2006 | Vandermeulen et al. |
| 2006/0238600 | A1 | 10/2006 | Vandermeulen et al. |
| 2007/0009302 | A1 | 1/2007 | Vandermeulen |
| 2007/0172286 | A1 | 7/2007 | Pomfret |
| 2008/0080922 | A1 | 4/2008 | Vandermeulen |
| 2008/0084494 | A1 | 4/2008 | Pomfret |
| 2008/0298872 | A1 | 12/2008 | Kubota et al. |
| 2010/0166475 | A1 | 7/2010 | Yamaguchi et al. |
| 2010/0166477 | A1 | 7/2010 | Yamaguchi et al. |
| 2010/0166478 | A1 | 7/2010 | Yamaguchi et al. |
| 2010/0166479 | A1 | 7/2010 | Yamaguchi et al. |
| 2010/0166480 | A1 | 7/2010 | Yamaguchi et al. |
| 2010/0247205 | A1 | 9/2010 | Yamaguchi et al. |
| 2010/0247206 | A1 | 9/2010 | Yamaguchi et al. |
| 2010/0254742 | A1 | 10/2010 | Yamaguchi et al. |
| 2015/0283836 | A1 | 10/2015 | Sakano et al. |
| 2016/0114598 | A1 | 4/2016 | Kawakami et al. |
| 2016/0236495 | A1 | 8/2016 | Sakano et al. |
| 2016/0368275 | A1 | 12/2016 | Sakano et al. |
| 2016/0368294 | A1 | 12/2016 | Sakano et al. |
| 2018/0037043 | A1 | 2/2018 | Sakano et al. |
| 2019/0030935 | A1 | 1/2019 | Sakano et al. |
| 2020/0147988 | A1 | 5/2020 | Sakano et al. |
| 2022/0219472 | A1 | 7/2022 | Higasahi et al. |

FOREIGN PATENT DOCUMENTS

| | | | |
|---|---|---|---|
| CN | 1376115 | A | 10/2002 |
| CN | 1469811 | A | 1/2004 |
| CN | 1469812 | A | 1/2004 |
| CN | 1533332 | A | 9/2004 |
| CN | 1579796 | A | 2/2005 |
| CN | 101022956 | A | 8/2007 |
| CN | 101318415 | A | 12/2008 |
| CN | 101683790 | A | 3/2010 |
| CN | 102092201 | A | 6/2011 |
| CN | 103273748 | A | 9/2013 |
| CN | 203799182 | U | 8/2014 |
| CN | 105538907 | A | 5/2016 |
| CN | 106132712 | A | 11/2016 |
| EP | 0414544 | A2 | 2/1991 |
| GB | 2016411 | A | 9/1979 |
| JP | S50-36734 | B1 | 11/1975 |
| JP | S54-111914 | A | 9/1979 |
| JP | S58-141479 | A | 8/1983 |
| JP | S59-6460 | A | 1/1984 |
| JP | S59-95180 | A | 6/1984 |
| JP | S60-8072 | U | 1/1985 |
| JP | S60-9657 | U | 1/1985 |
| JP | S60-24565 | U | 2/1985 |
| JP | S60-36255 | U | 3/1985 |
| JP | S60-46254 | U | 4/1985 |
| JP | S60-48456 | U | 4/1985 |
| JP | S60-188821 | A | 9/1985 |
| JP | S60-224571 | A | 11/1985 |
| JP | S61-154877 | A | 7/1986 |
| JP | S62-103179 | U | 5/1987 |
| JP | S63-156762 | U | 10/1988 |
| JP | H02-6173 | A | 1/1990 |
| JP | H02-9562 | U | 1/1990 |
| JP | H02-11379 | A | 1/1990 |
| JP | H02-11380 | A | 1/1990 |
| JP | H02-37568 | Y2 | 10/1990 |
| JP | H03-97181 | A | 4/1991 |
| JP | H03-284973 | A | 12/1991 |
| JP | H04-152176 | A | 5/1992 |
| JP | H05-41834 | U | 6/1993 |
| JP | H05-139006 | A | 6/1993 |
| JP | H05-53956 | A | 7/1993 |
| JP | H07-9745 | A | 1/1995 |
| JP | H07-32710 | A | 2/1995 |
| JP | H07-276755 | A | 10/1995 |
| JP | H07-276757 | A | 10/1995 |
| JP | H08-183204 | A | 7/1996 |
| JP | H08-183230 | A | 7/1996 |
| JP | H08-183232 | A | 7/1996 |
| JP | 2000-6504 | A | 1/2000 |
| JP | 2000-103149 | A | 4/2000 |
| JP | 2001-47713 | A | 2/2001 |
| JP | 2002-104717 | A | 4/2002 |
| JP | 2002-211092 | A | 7/2002 |
| JP | 2005-280060 | A | 10/2005 |
| JP | 2007-502221 | A | 2/2007 |
| JP | 2008-261968 | A | 10/2008 |
| JP | 2009-196804 | A | 9/2009 |
| JP | 2011-46142 | A | 3/2011 |
| JP | 2011-098525 | A | 5/2011 |
| JP | 2011-148167 | A | 8/2011 |
| JP | 2011-150007 | A | 8/2011 |
| JP | 2011-207194 | A | 10/2011 |
| JP | 2012-135931 | A | 7/2012 |
| JP | 2012-158175 | A | 8/2012 |
| JP | 2012-236307 | A | 12/2012 |
| JP | 2014-170142 | A | 9/2014 |
| JP | 2015-182318 | A | 10/2015 |
| JP | 2017-30333 | A | 2/2017 |
| WO | 2005/018944 | A1 | 3/2005 |
| WO | 2010125127 | A1 | 11/2010 |
| WO | 2021/065470 | A1 | 4/2021 |

OTHER PUBLICATIONS

Extended European Search Report for European Patent Application No. 20872473.2 dated Aug. 4, 2023.

International Preliminary Report on Patentability dated Apr. 5, 2022 and Written Opinion of the International Search Report for PCT/JP2020/034864 dated Nov. 17, 2020.

Chinese Office Action for the related Chinese Patent Application No. 202080068273.3 dated Feb. 7, 2024.

(56) References Cited

OTHER PUBLICATIONS

Japanese Office Action for the related Japanese Patent Application No. 2023-121496 dated Aug. 27, 2024.
The European Office Action for the related European Patent Application No. 20872473.2 dated Jun. 26, 2024.
International Search Report and Written Opinion of the International Search Report for PCT/JP2020/034869 dated Nov. 10, 2020.
International Preliminary Report on Patentability and English language Written Opinion pf of the International Search Report for PCT/JP2020/034869 dated Apr. 5, 2022.
Chinese Office Action for Chinese Application No. 202080066599.2 dated Feb. 7, 2024.

* cited by examiner

PRINTING APPARATUS AND PRINT CASSETTE

CROSS-REFERENCE TO RELATED APPLICATION

This is a continuation application of International Application No. PCT/JP2020/034864 filed on Sep. 15, 2020 which claims priority from Japanese Patent Application No. 2019-178912 filed on Sep. 30, 2019. The entire contents of the earlier applications are incorporated herein by reference.

TECHNICAL FIELD

The present disclosure relates to a printing apparatus and a print cassette.

BACKGROUND

In an apparatus that performs processing such as printing on a tape, the tape is replaced and supplied by attaching and detaching a cassette storing the tape to and from a main body. As a cassette used in such an apparatus, a cassette in which a gear is provided on a reel around which a tape is wound is known (refer to Patent Literature 1).

SUMMARY

According to an aspect of the disclosure, a printing apparatus includes a printing apparatus main body, and a print cassette attachable to and detachable from the printing apparatus main body. The print cassette includes a roll of a first tape, a supply spool rotatable about a rotation axis, a second tape wound around the supply spool and used for printing or protecting of the first tape, an output gear to output a driving force outside, an input spool rotatable about a rotation axis, and an input gear directly or indirectly engaging the output gear to transmit the driving force to the output gear. A rotation axis of the input gear is located collinearly with the rotation axis of the input spool. The input spool, the input gear, and the roll are disposed in order of the input spool, the input gear, and the roll in an axial direction of the rotation axis of the supply spool. The supply spool, the output gear, and the roll are disposed in order of the supply spool, the output gear, and the roll in the axial direction of the rotation axis of the supply spool. The printing apparatus main body includes a print head to print on the first tape, a platen roller to convey the first tape, a platen gear coupled to the platen roller to engage the output gear, and a drive shaft to engage the input gear when inserted in the input spool to rotate the input spool and the input gear. In a state where the print cassette is attached to the printing apparatus main body, the drive shaft engages the input gear and the platen gear engages the output gear, when the drive shaft rotates the input gear, the output gear is rotated, the platen gear rotates with rotation of the output gear, and the platen roller rotates with rotation of the platen gear.

According to an aspect of the disclosure, a print cassette includes a roll of a first tape, a supply spool rotatable about a rotation axis, a second tape wound around the supply spool and used for printing or protecting of the first tape, and an output gear to output a driving force outside. The supply spool, the output gear, and the roll are disposed in order of the supply spool, the output gear, and the roll in an axial direction of the rotation axis of the supply spool.

According to an aspect of the disclosure, a print cassette is attachable to and detachable from a printing apparatus main body. The print cassette includes a roll of a first tape, a supply spool rotatable about a rotation axis, a second tape wound around the supply spool and used for printing or protecting of the first tape, an output gear to output a driving force outside, an input spool rotatable about a rotation axis, and an input gear directly or indirectly engaging the output gear to transmit the driving force to the output gear. A rotation axis of the input gear is located collinearly with the rotation axis of the input spool. The input spool, the input gear, and the roll are disposed in order of the input spool, the input gear, and the roll in an axial direction of the rotation axis of the supply spool. The supply spool, the output gear, and the roll are disposed in order of the supply spool, the output gear, and the roll in the axial direction of the rotation axis of the supply spool. The printing apparatus main body includes a print head to print on the first tape, a platen roller to convey the first tape, a platen gear coupled to the platen roller to engage the output gear, and a drive shaft to engage the input gear when inserted in the input spool to rotate the input spool and the input gear. In a state where the print cassette is attached to the printing apparatus main body, the drive shaft engages the input gear and the platen gear engages the output gear, when the drive shaft rotates the input gear, the output gear is rotated, the platen gear rotates with rotation of the output gear, and the platen roller rotates with rotation of the platen gear.

According to an aspect of the disclosure, a print cassette includes a roll of a first tape, an output gear rotatable about a rotation axis to output a driving force outside, and a case in which at least a portion of the roll and at least a portion of the output gear are located, the case having an exit from which the first tape pulled out from the roll is discharged. The exit, the output gear, and the roll are disposed in order of the exit, the output gear, and the roll in an axial direction of the rotation axis of the output gear.

DETAILED DESCRIPTION

In the above-described cassette, the gear is disposed in the vicinity of a surface of the case perpendicular to an axial direction of the reel. Therefore, when the cassette is dropped and the surface collides with something like a floor surface, the gear is susceptible to damage.

An object of the present disclosure is to provide a printing apparatus and a print cassette capable of preventing damage to a gear that outputs a driving force to outside the cassette.

1. First Embodiment

[1-1. Configuration]

Figure 1A:
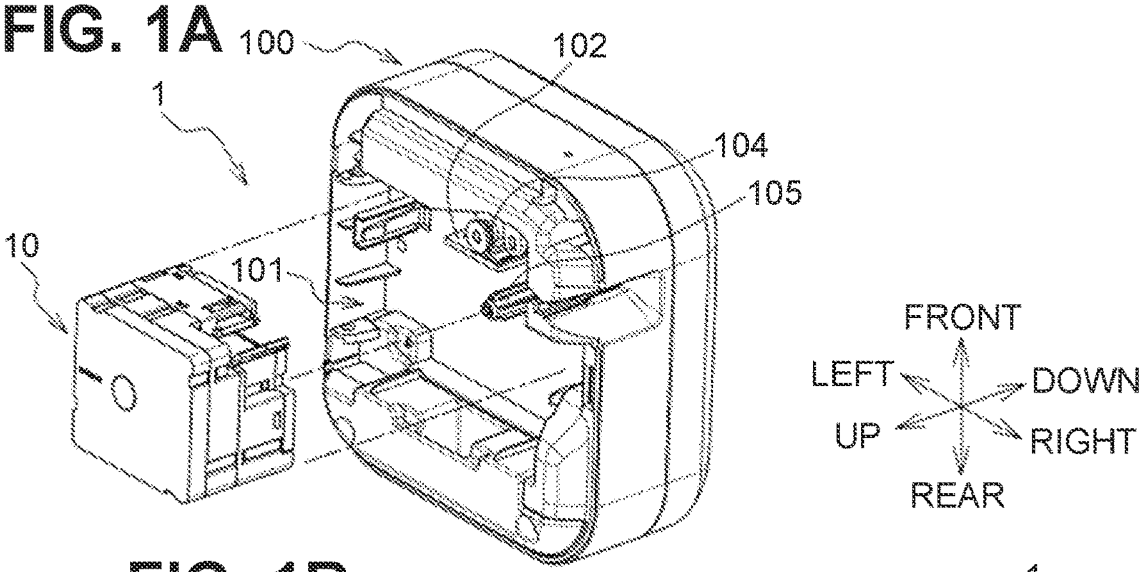
FIGS. 1A, 1B, and 1C are schematic perspective views illustrating a state in which a print cassette is detached from a printing apparatus main body in a printing apparatus according to an embodiment.
Figure 1B:
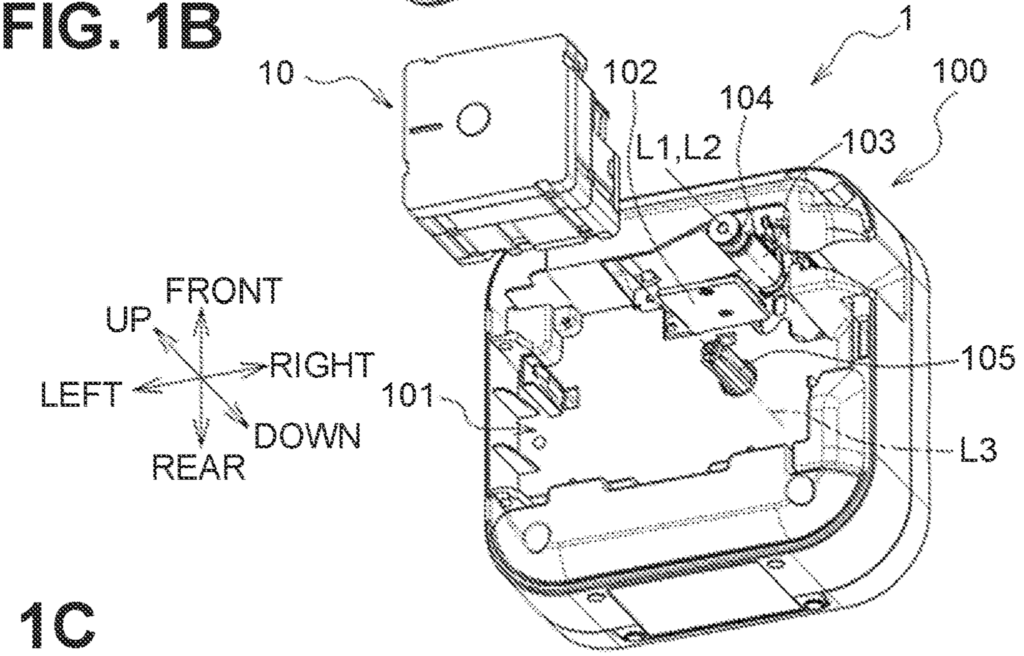
Figure 1C:
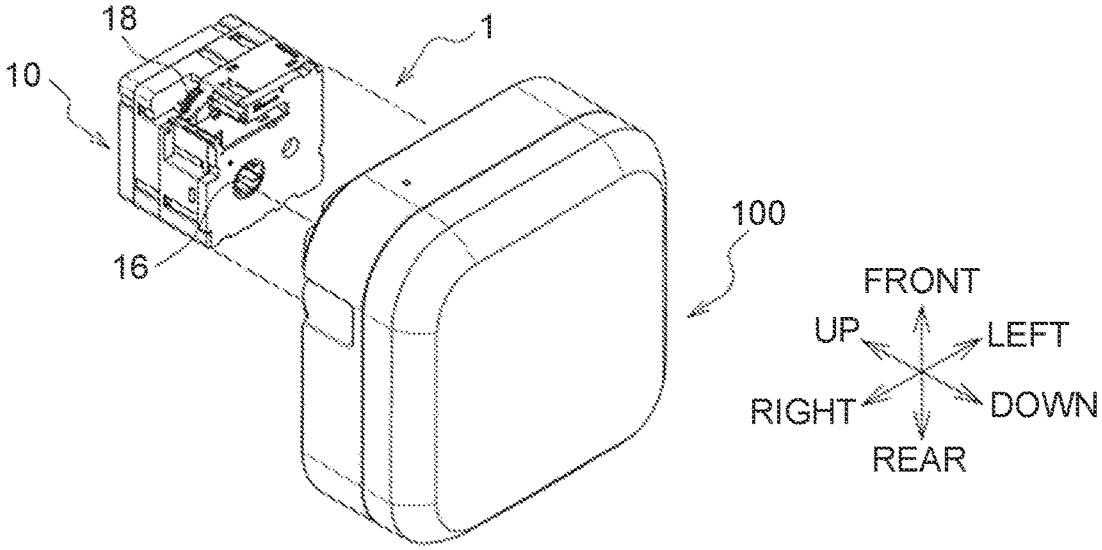

A printing apparatus 1 illustrated in FIGS. 1A, 1B, and 1C includes a print cassette 10 and a printing apparatus main body 100. The printing apparatus 1 is an apparatus that performs printing on a tape print medium.

In the present embodiment, an axial direction of an output gear 18 is an up-down direction, a direction perpendicular to the up-down direction in which the output gear 18 and an input spool 16 are aligned is a front-rear direction, and a direction perpendicular to both the up-down direction and the front-rear direction is a left-right direction.

<Printing Apparatus Main Body>

As illustrated in FIG. 1B, the printing apparatus main body 100 includes a cassette insertion portion 101, a print head 102, a platen roller 103, a platen gear 104, and a drive shaft 105.

(Cassette Insertion Portion)

The cassette insertion portion 101 is a recessed portion to which the print cassette 10 is attached. The cassette insertion portion 101 has a function of positioning the print cassette 10.

(Print Head)

The print head 102 is disposed in an interior of the cassette insertion portion 101. The print head 102 has a plurality of heating elements whose heat generation is to be individually controlled.

(Platen Roller)

A rotation axis L1 of the platen roller 103 is parallel to the up-down direction. The platen roller 103 is disposed near the print head 102 in the interior of the cassette insertion portion 101. The platen roller 103 is swingable in a direction toward or away from the print head 102.

(Platen Gear)

The platen gear 104 is coupled to the platen roller 103. In the present embodiment, a rotation axis L2 of the platen gear 104 is located collinearly with the rotation axis L1 of the platen roller 103. The platen gear 104 is swingable together with the platen roller 103.

(Drive Shaft)

The drive shaft 105 is inserted into the input spool 16. The drive shaft 105 rotates the input spool 16.

The drive shaft 105 is disposed in the interior of the cassette insertion portion 101. A rotation axis L3 of the drive shaft 105 is parallel to the up-down direction. The drive shaft 105 is rotated about the rotation axis L3 by a drive source (for example, a motor), which is not illustrated.

<Print Cassette>

The print cassette 10 houses a print medium. The print cassette 10 is attachable to and detachable from the printing apparatus main body 100. By replacing the print cassette 10, a print medium can be supplied and the type (for example, color, material, etc.) of print medium can be changed.

Figure 2A:
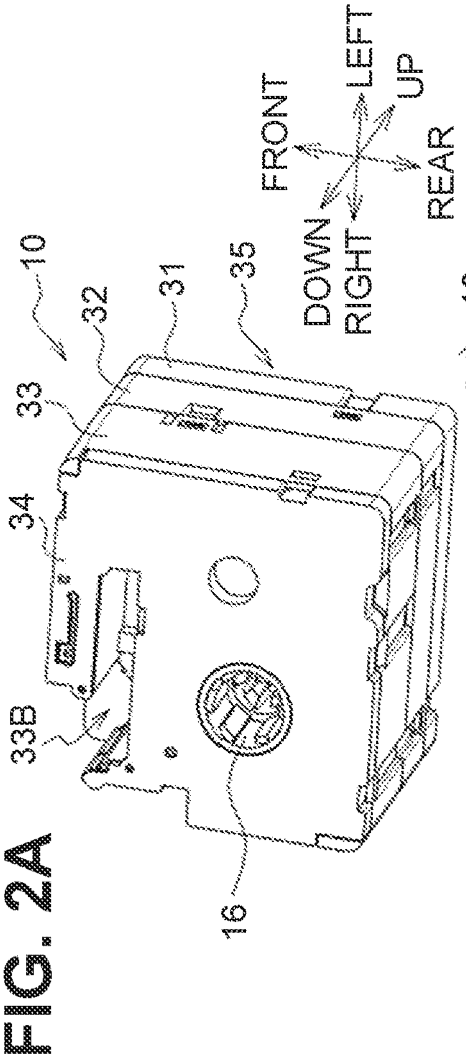
FIGS. 2A, 2B and 2C are schematic perspective views of the print cassette in the printing apparatus of FIG. 1A.
Figure 2C:
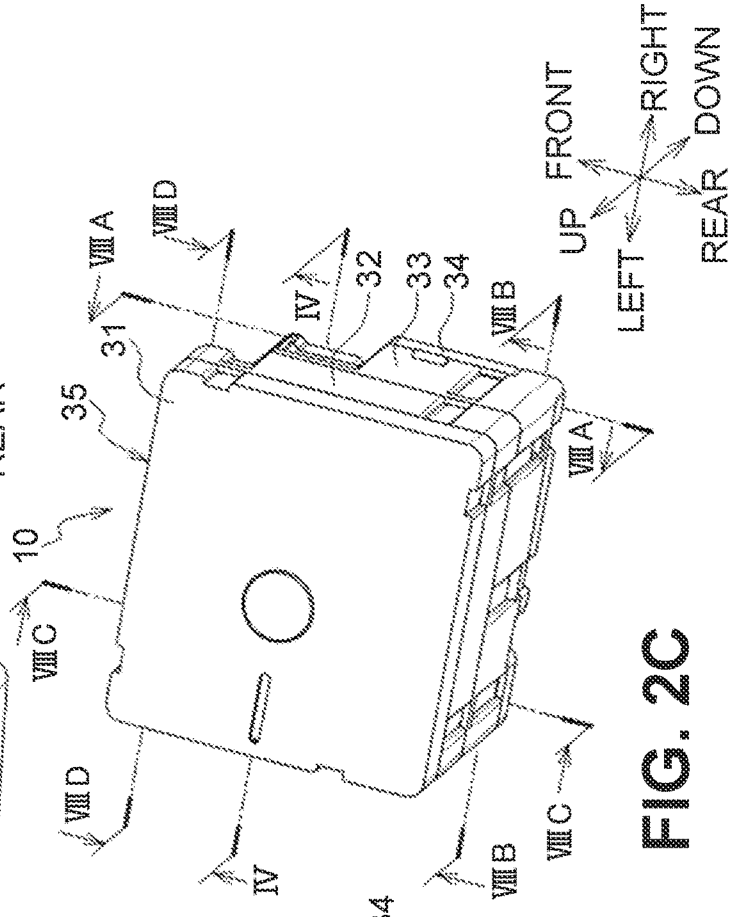
Figure 2B:
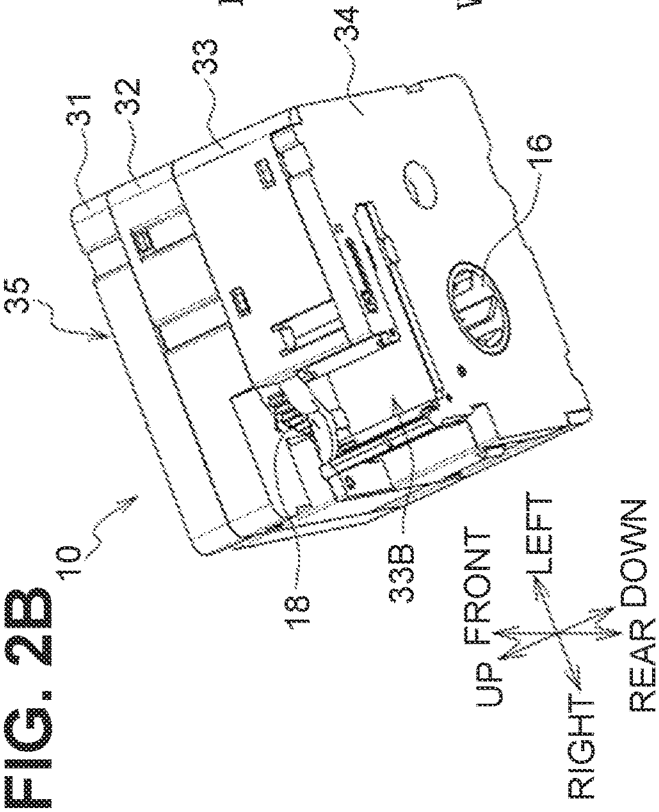

As illustrated in FIGS. 2A, 2B, and 2C, the print cassette 10 includes a case 35 that houses a first tape 11A, an ink ribbon (an example of a second tape) 14A, and the like. The outer shape of the print cassette 10 (i.e., the shape of the case 35) is a rectangular parallelepiped having sides parallel to the up-down direction, sides parallel to the front-rear direction, and sides parallel to the left-right direction. The case 35 has a first lid portion 31, a first frame portion 32, a second frame portion 33, and a second lid portion 34.

Figure 3:
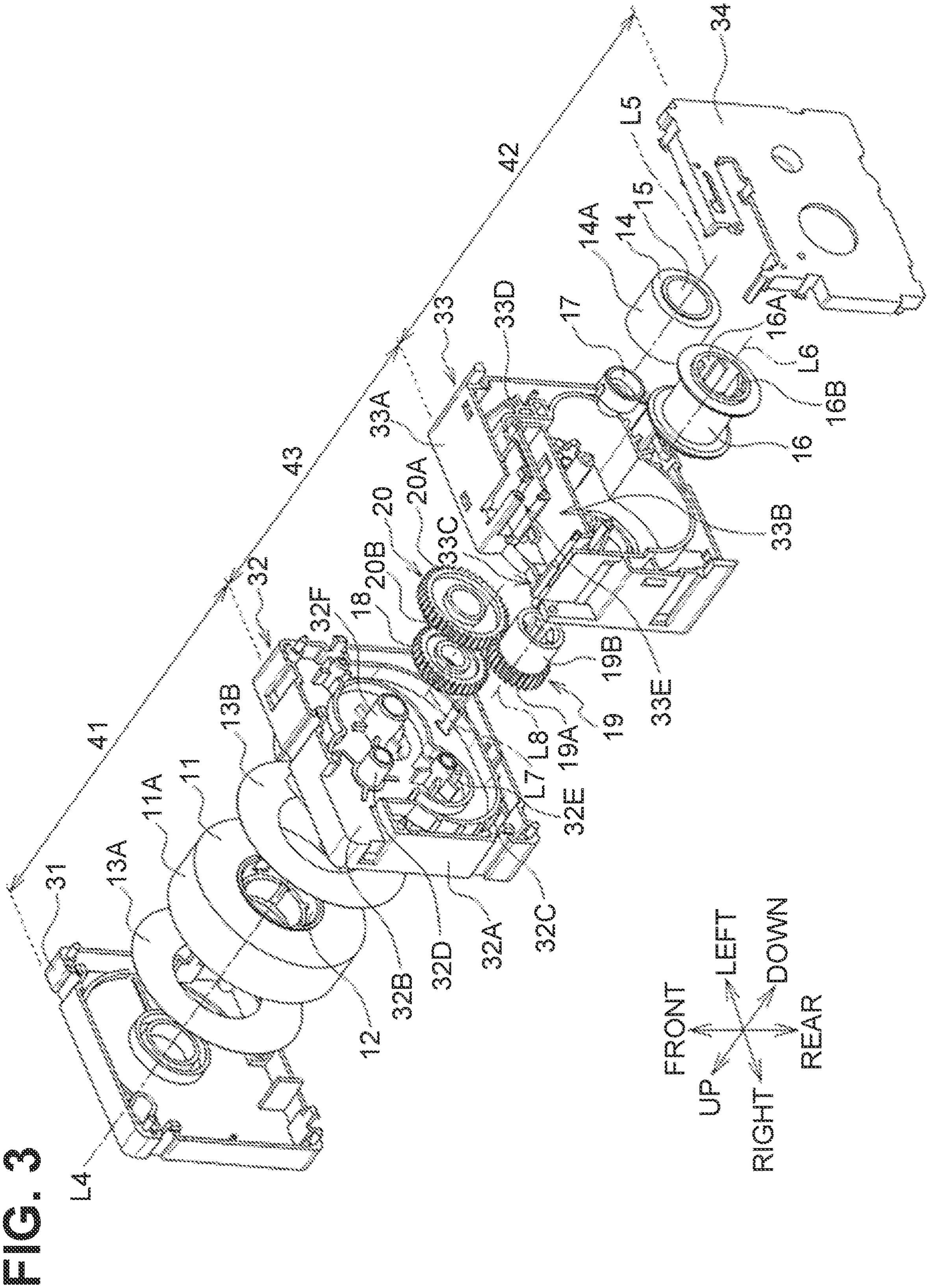
FIG. 3 is a schematic exploded perspective view of the print cassette of FIG. 2A.

As illustrated in FIG. 3, the print cassette 10 includes a first roll 11, a first supply spool 12, spacer films 13A and 13B, a second roll 14, a second supply spool 15, the input spool 16, a clutch spring holder 17, an output gear 18, an input gear 19, and an idle gear 20.

(First Roll)

In the first roll 11, a first tape 11A on which printing is to be performed is wound around the first supply spool 12. Printing is performed on the first tape 11A by the print head 102 of the printing apparatus main body 100 and the ink ribbon 14A.

Two spacer films 13A and 13B are disposed on outer sides of the first roll 11 in the up-down direction in such a manner as to sandwich the first roll 11. The spacer film 13A is disposed between the first roll 11 and the first lid portion 31 and the spacer film 13B is disposed between the first roll 11 and the first frame portion 32.

(First Supply Spool)

The first supply spool 12 is rotatable about a rotation axis L4. The first supply spool 12 rotates along with the platen roller 103 of the printing apparatus main body 100 conveying the first tape 11A, thereby supplying the first tape 11A to the print head 102.

(Second Roll)

In the second roll 14, the ink ribbon 14A used for printing on the first tape 11A is wound around the second supply spool 15.

The ink ribbon 14A is superimposed on the first tape 11A in the head opening 33B and is supplied for printing by the print head 102. The ink ribbon 14A used for printing is taken up by the input spool 16. The second roll 14 is subjected to rotation pressure applied by a clutch spring held by a clutch spring holder 17. At least a portion of the second roll 14 is disposed at a position overlapping the first roll 11 in the up-down direction.

(Second Supply Spool)

The second supply spool 15 is rotatable about a rotation axis L5. The rotation axis L5 of the second supply spool 15 is parallel to the rotation axis L4 of the first supply spool 12, that is, parallel to the up-down direction.

The second supply spool 15 rotates along with the input spool 16 taking up the ink ribbon 14A, thereby supplying the ink ribbon 14A to the print head 102.

(Input Spool)

The input spool 16 is rotatable about a rotation axis L6. The rotation axis L6 of the input spool 16 is parallel to the rotation axis L5 of the second supply spool 15.

The input spool 16 is cylindrical and has an inner peripheral surface 16A defining a hollow portion. The inner peripheral surface 16A of the input spool 16 is provided with spline teeth 16B. A drive shaft 105 of the printing apparatus main body 100 is coupled to the spline teeth 16B. The input spool 16 is rotated by the drive shaft 105.

(Output Gear)

The output gear 18 is a gear for outputting a driving force for conveying the first tape 11A to the outside. Specifically, the output gear 18 outputs a driving force to the platen gear 104 of the printing apparatus main body 100.

The output gear 18 is a single gear having a first side surface and a second side surface perpendicular to a rotation axis L7. The rotation axis L7 of the output gear 18 is parallel to the rotation axis L5 of the second supply spool 15. Further, in an axial direction of the rotation axis L5 of the second supply spool 15 (i.e., the up-down direction), the first side surface is located at a position closer to the first roll 11 than the second side surface is. The entire region of the first side surface overlaps a cover portion 32B in the up-down direction.

The output gear 18 is partially exposed to the head opening 33B. The output gear 18 engages the platen gear 104 at the head opening 33B in a state in which the print cassette 10 is attached to the printing apparatus main body 100.

Figure 4:
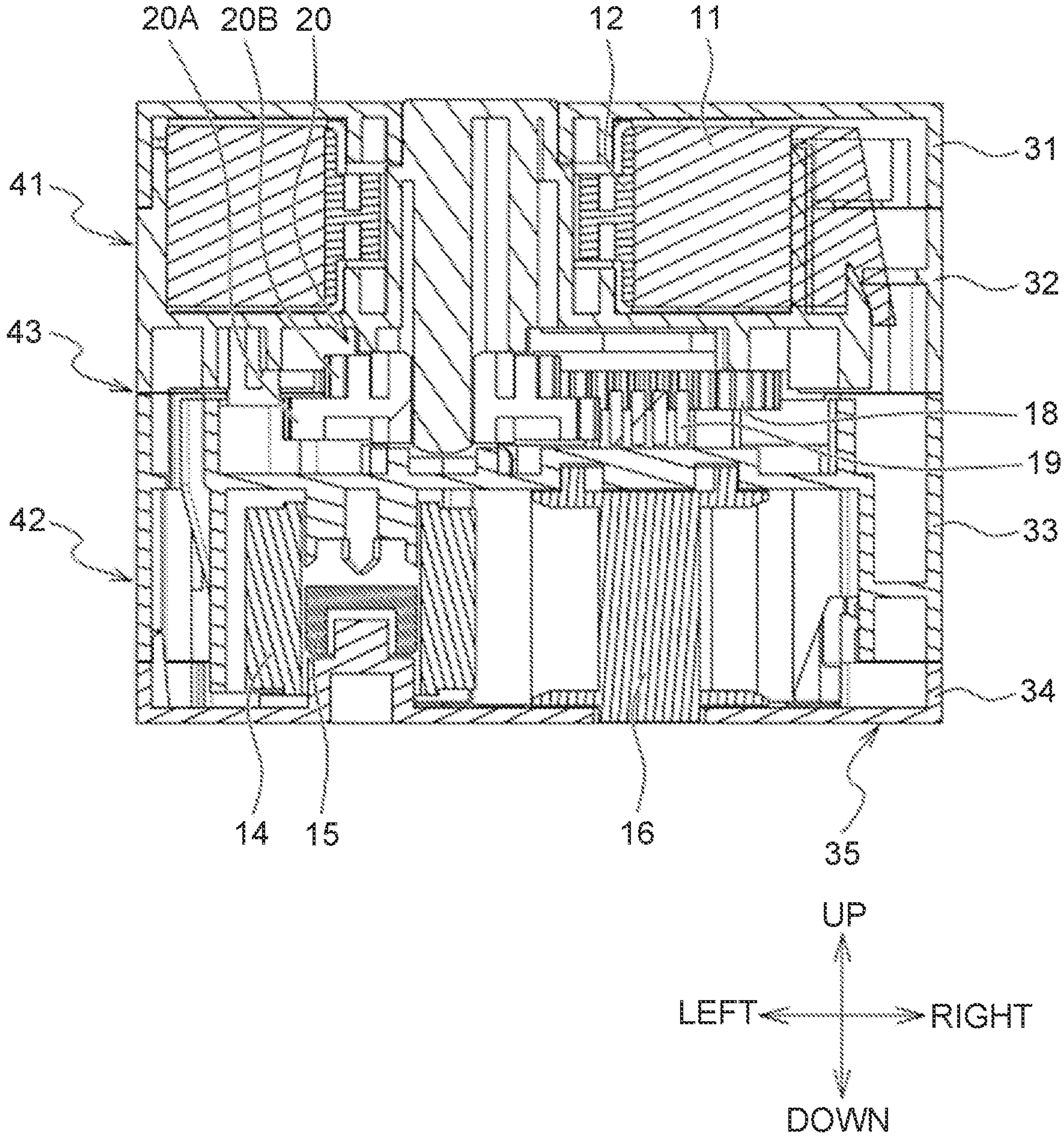
FIG. 4 is a schematic cross-sectional view taken along line IV-IV of FIG. 2C.

As illustrated in FIG. 4, the second supply spool 15, the output gear 18, and the first roll 11 are disposed in order of the second supply spool 15, the output gear 18, and the first roll 11 in the up-down direction. That is, the output gear 18 is positioned between the second supply spool 15 and the first roll 11 in the up-down direction.

(Input Gear)

As illustrated in FIG. 3, the input gear 19 is a gear that indirectly engages the output gear 18 via an idle gear 20 to transmit a driving force to the output gear 18.

The input gear 19 includes a gear 19A and a cylindrical spool 19B fixed to one side surface of the gear 19A and having spline teeth on an inner peripheral surface thereof. The gear 19A is rotated integrally with the spool 19B by the driving force input to the spool 19B.

A rotation axis L8 of the input gear 19 (i.e., a rotational axis of the gear 19A and a rotation axis of the spool 19B) is located collinearly with the rotation axis L6 of the input spool 16. As illustrated in FIG. 4, the input spool 16, the input gear 19, and the first roll 11 are disposed in order of the input spool 16, the input gear 19, and the first roll 11 in the up-down direction.

That is, the input gear 19 is positioned between the input spool 16 and the first roll 11 in the up-down direction. At least a portion of the input gear 19 is located at a position overlapping the first roll 11 in the up-down direction.

The rotation axis L8 of the input gear 19 overlaps the hollow portion of the input spool 16 in the up-down direction. The drive shaft 105 is thus simultaneously inserted through the input spool 16 and the input gear 19. As a result, although not directly coupled to the input spool 16, the input gear 19 is rotated by a common drive source (i.e., the drive shaft 105) with the input spool 16.

(Idle Gear)

The idle gear 20 engages the input gear 19 and the output gear 18. The idle gear 20 constitutes a transmission mechanism to transmit the driving force input to the input gear 19 to the output gear 18.

The idle gear 20 is a stepped gear in which a first gear 20A engaged with the input gear 19 and a second gear 20B engaged with the output gear 18 are disposed coaxially. The second gear 20B has a smaller diameter than the first gear 20A has. Further, the second gear 20B is disposed at a position closer to the first roll 11 than the first gear 20A is in the up-down direction (i.e., at a position upper than the first gear 20A). The idle gear 20 constitutes a speed reduction mechanism that reduces the rotational speed of the driving force input to the input gear 19.

(Case)

As illustrated in FIG. 3, the first lid portion 31 constitutes an upper end portion of the print cassette 10. The first frame portion 32 is disposed below the first lid portion 31 and connected to the first lid portion 31 in the up-down direction. The second frame portion 33 is disposed below the first frame portion 32 and connected to the first frame portion 32 in the up-down direction. The second lid portion 34 constitutes a lower end portion of the print cassette 10. The second lid portion 34 is connected to the second frame portion 33 in the up-down direction.

The first lid portion 31 and the first frame portion 32 constitute a first case portion 41 that houses the first roll 11. That is, the first roll 11 is disposed in a space surrounded by the first lid portion 31 and the first frame portion 32.

The second lid portion 34 and the second frame portion 33 constitute a second case portion 42 that houses the second roll 14, the second supply spool 15, and the input spool 16. That is, the second roll 14, the second supply spool 15, and the input spool 16 are disposed in a space surrounded by the second lid portion 34 and the second frame portion 33.

The first frame portion 32 and the second frame portion 33 constitute a third case portion 43 in which a portion of the output gear 18, the input gear 19, and the idle gear 20 are disposed. That is, a portion of the output gear 18, the input gear 19, and the idle gear 20 are disposed in a space surrounded by the first frame portion 32 and the second frame portion 33. The third case portion 43 is disposed between the first case portion 41 and the second case portion 42 in the up-down direction.

The first frame portion 32 includes a first sidewall 32A, a cover portion 32B, a first guide 32C, a first gear support portion 32D, a second gear support portion 32E, and a third gear support portion 32F. The first sidewall 32A constitutes a side surface parallel to the up-down direction of the print cassette 10. The cover portion 32B has a surface perpendicular to the up-down direction.

The cover portion 32B is disposed at a position overlapping the output gear 18 in the up-down direction. In the present embodiment, the cover portion 32B is provided continuously with a lower end portion of the first sidewall 32A and is disposed at a right front corner portion of the first frame portion 32.

The output gear 18, the cover portion 32B, and the first roll 11 are disposed in order of the output gear 18, the cover portion 32B, and the first roll 11 in the up-down direction. As described above, the entire region of the first side surface (i.e., the upper side surface) of the output gear 18 overlaps the cover portion 32B in the up-down direction.

Figure 5:
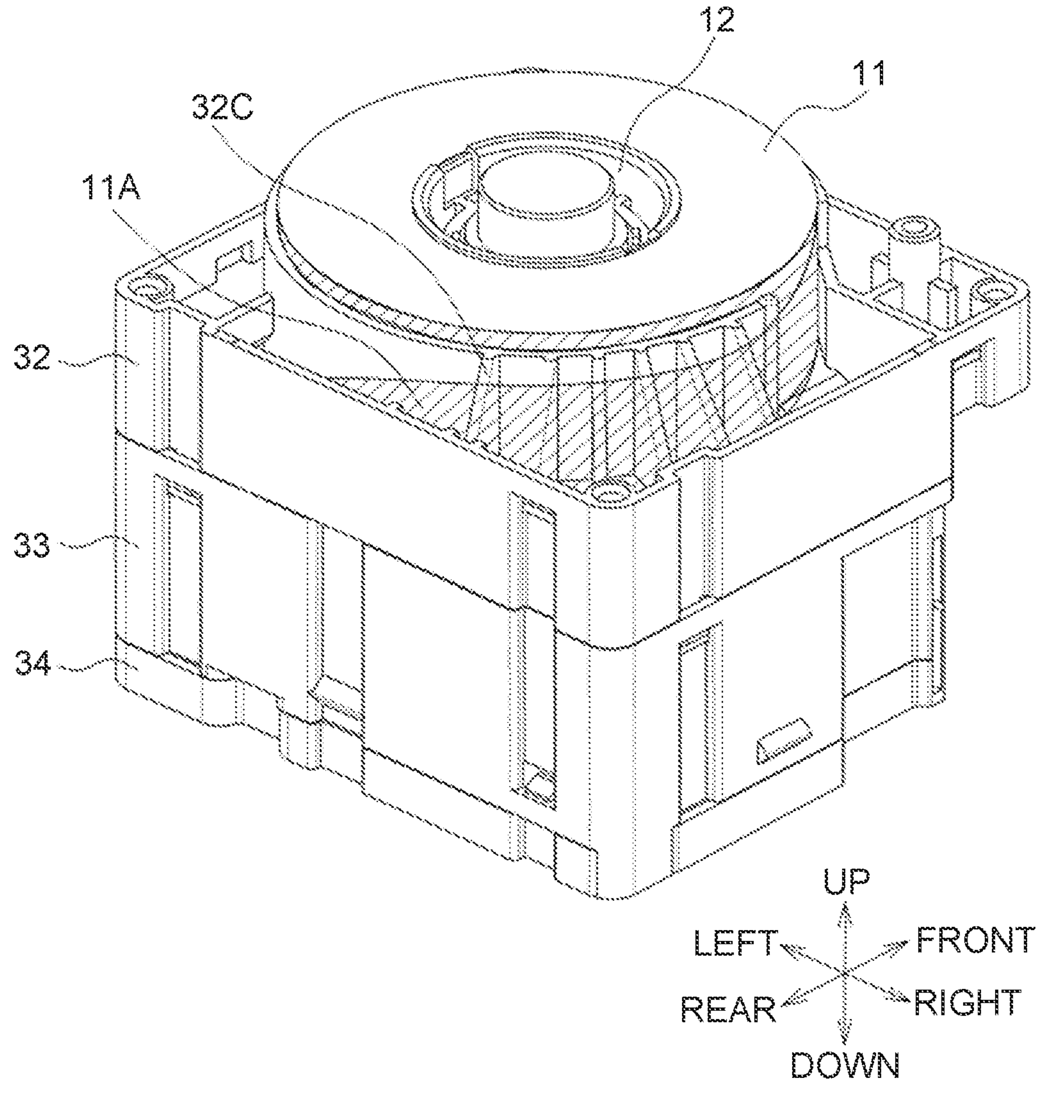
FIG. 5 is a schematic perspective view illustrating a state of the print cassette of FIG. 2C from which a first lid portion is detached.

As illustrated in FIG. 5, the first guide 32C is a portion around which the first tape 11A pulled out from the first roll 11 is wound. The first guide 32C has a plurality of plate-shaped ribs spaced apart from each other in a circumferential direction of the first roll 11. Each of the ribs protrudes in a radial direction of the first roll 11, and a protrusion amount (i.e., a plate width) increases downward.

The first gear support portion 32D illustrated in FIG. 3 rotatably supports the output gear 18. The second gear support portion 32E rotatably supports the input gear 19. The third gear support portion 32F rotatably supports the idle gear 20.

The second frame portion 33 has a second sidewall 33A, the head opening 33B, a discharge port 33C, a second guide 33D, and an exit 33E. The second sidewall 33A constitutes a side surface parallel to the up-down direction of the print cassette 10.

The head opening 33B is a portion missing from the second sidewall 33A. In a state in which the print cassette 10 is attached to the printing apparatus main body 100, the head opening 33B is a space in which the print head 102 inserted from below is disposed. The head opening 33B is open downward in the print cassette 10.

The second guide 33D is a portion around which the first tape 11A having passed through the first guide 32C is wound. Similarly to the first guide 32C, the second guide 33D has a plurality of plate-shaped ribs spaced apart from each other in a circumferential direction of the second roll 14. Each of the ribs protrudes in a radial direction of the first roll 14, and a protrusion amount (i.e., a plate width) increases downward.

The exit 33E is a portion where the first tape 11A pulled out from the first roll 11 is discharged to the head opening 33B. That is, the exit 33E communicates with the head opening 33B. In addition, the exit 33E, the output gear 18, and the first roll 11 are disposed in order of the exit 33E, the output gear 18, and the first roll 11 in the up-down direction.

Figure 6:
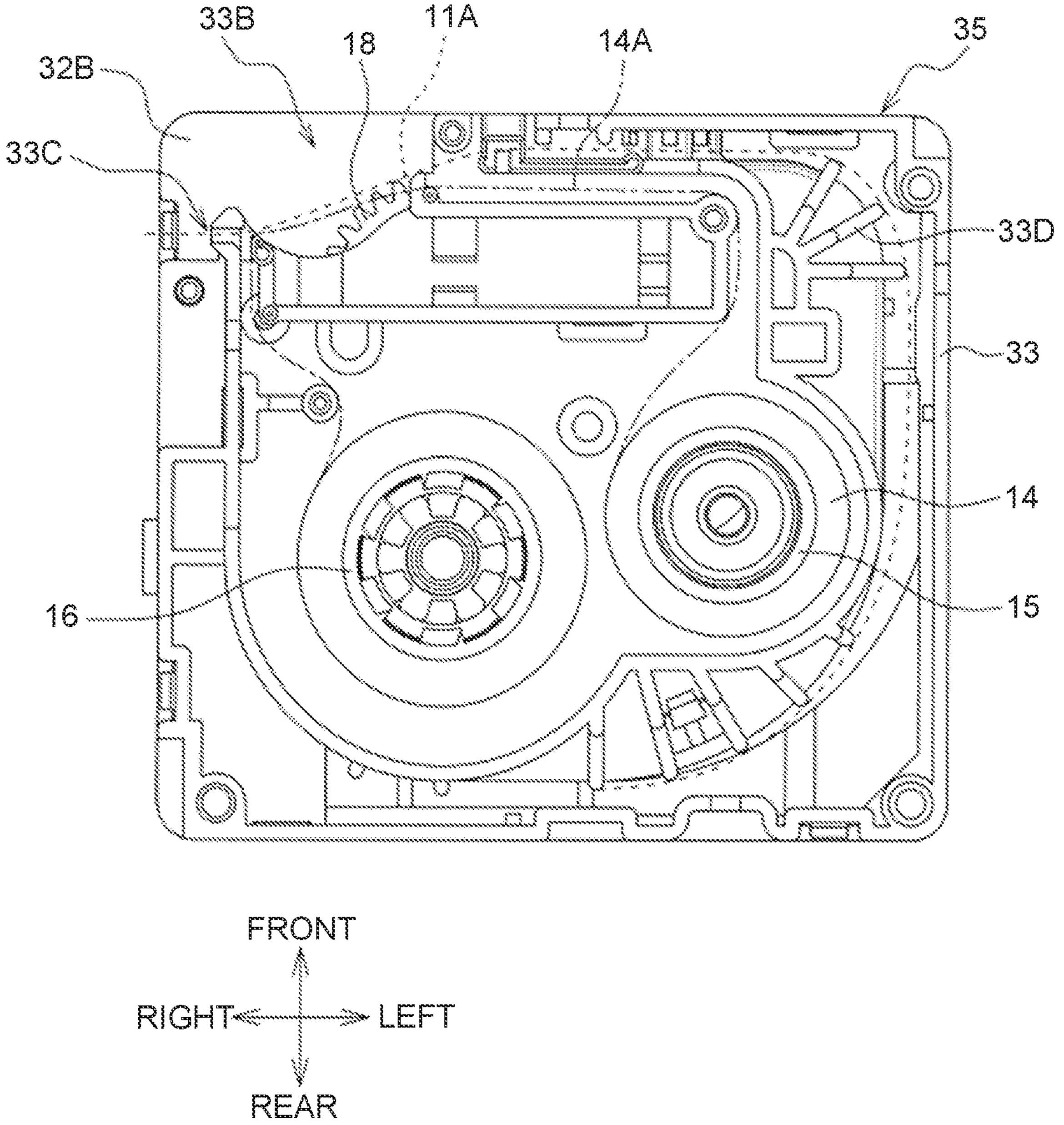
FIG. 6 is a schematic view for explaining a passage of a first tape and an ink ribbon in the print cassette of FIG. 2A.

As illustrated in FIG. 6, the first tape 11A and the ink ribbon 14A are laid across the head opening 33B in the left-right direction. The printed first tape 11A is discharged from the discharge port 33C outside the printing apparatus 1.

The head opening 33B and the discharge port 33C are part of the second case portion 42. A portion of the output gear 18 is located in the head opening 33B. The cover portion 32B is exposed in the head opening 33B.

As illustrated in FIGS. 7A, 7B, 7C, and 7D, the first guide 32C and the second guide 33D constitute a passage through which the first tape 11A constituting the first roll 11 is fed from the first case portion 41 to the second case portion 42.

Figure 7A:
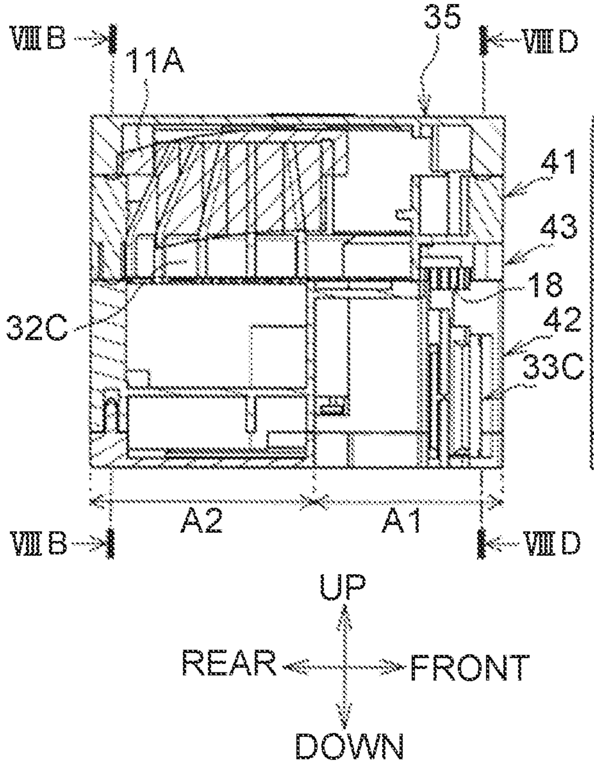
FIG. 7A is a schematic cross-sectional view taken along line VIIA-VIIA of FIG. 2C.
Figure 7B:
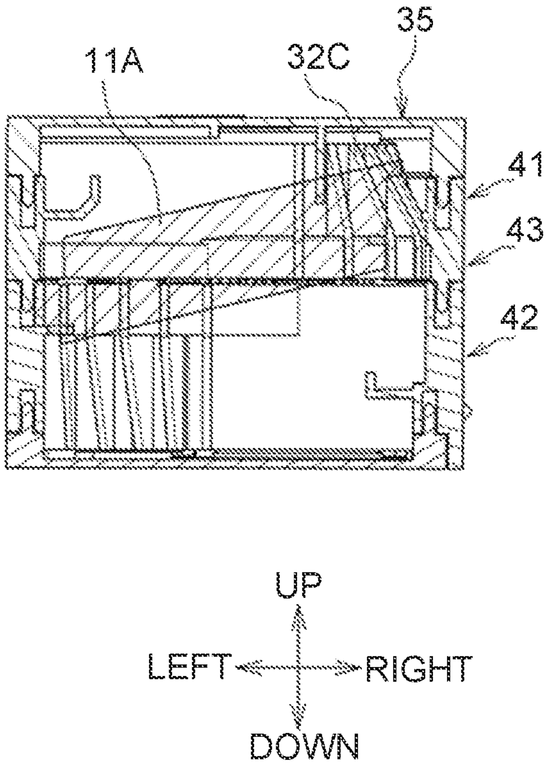
FIG. 7B is a schematic cross-sectional view taken along line VIIB-VIIB of FIG. 2C.

Specifically, as illustrated in FIG. 7A, the first tape 11A pulled out from the first roll 11 is conveyed in a spiral downward to the rear in the first case portion 41 while coming into contact with the first guide 32C from the outside of the first roll 11 in the radial direction. As illustrated in FIG. 7B, the first tape 11A is further conveyed downward to the left across the third case portion 43 in the up-down direction.

Figure 7C:
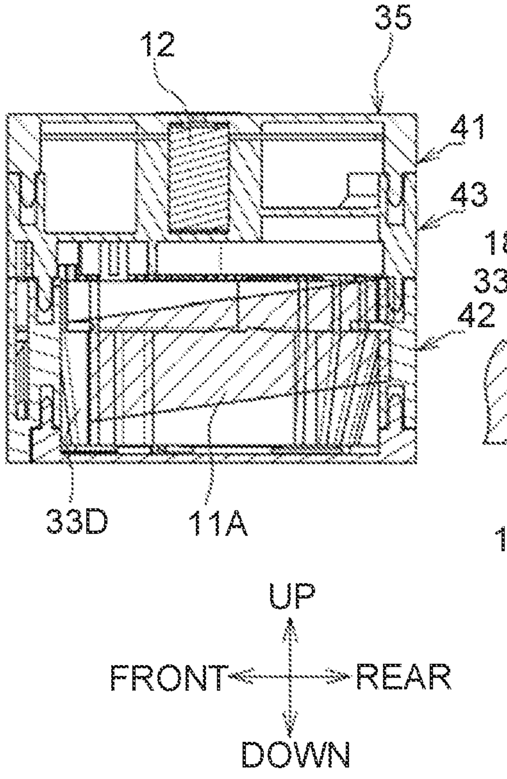
FIG. 7C is a schematic cross-sectional view taken along line VIIC-VIIC of FIG. 2C.
Figure 7D:
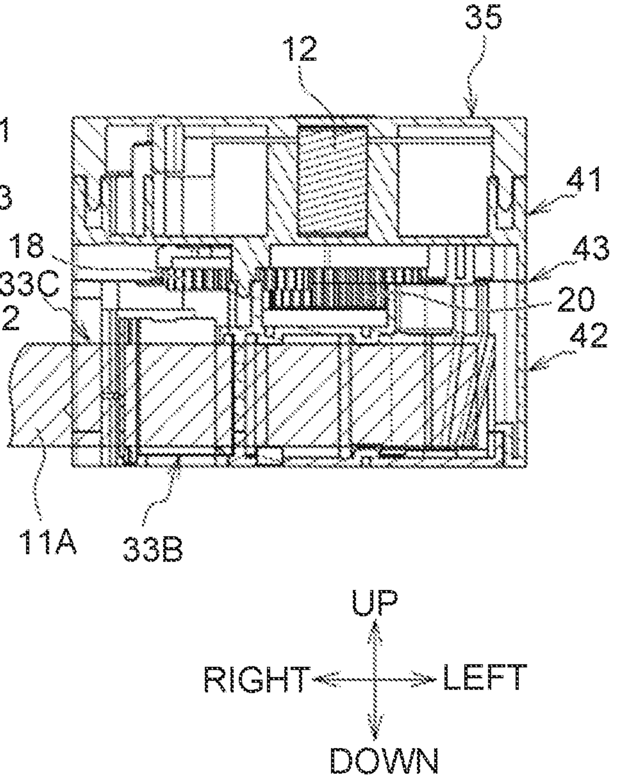
FIG. 7D is a schematic cross-sectional view taken along line VIID-VIID of FIG. 2C.

As illustrated in FIG. 7C, the first tape 11A that has reached the second case portion 42 is conveyed downward to the front while coming into contact with the second guide 33D from the radially outer side. As illustrated in FIG. 7D, the first tape 11A that has reached the lower end portion of the print cassette 10 passes through the head opening 33B and is discharged from the discharge port 33C.

As illustrated in FIG. 7A, the output gear 18 is located in a first region A1 of the case 35 in a first direction (i.e., the front-rear direction) orthogonal to the up-down direction. In contrast, the first tape 11A is diagonally laid in a second region A2 of the case 35 different from the first region A1 in a direction intersecting with a second direction (i.e., the left-right direction) orthogonal to the up-down direction and the first direction. The first region A1 of the present embodiment is a region in front of the second region A2.

Further, the first tape 11A is conveyed in the second direction toward the discharge port 33C in a region of the first region A1 across the output gear 18 from the first roll 11 in the up-down direction.

<Tape Conveyance and Printing by Printing Apparatus Main Body>

The print head 102 performs printing on the first tape 11A held by the print cassette 10.

In a state in which the print cassette 10 is attached to the printing apparatus main body 100, the print head 102 is disposed at a position overlapping the first tape 11A and the ink ribbon 14A in the front-rear direction in the head opening 33B (refer to FIG. 6).

The first tape 11A conveyed to the head opening 33B by the platen roller 103 is pressed via the ink ribbon 14A against the print head 102 in which the heating elements generate heat. As a result, a portion of ink disposed on the front face of the ink ribbon 14A is transferred to the first tape 11A, and characters, symbols, and the like are printed on the first tape 11A.

The platen roller 103 conveys the first tape 11A from inside the print cassette 10 to outside. The platen roller 103 abuts against the first tape 11A in the head opening 33B and presses the first tape 11A against the print head 102.

Figure 8:
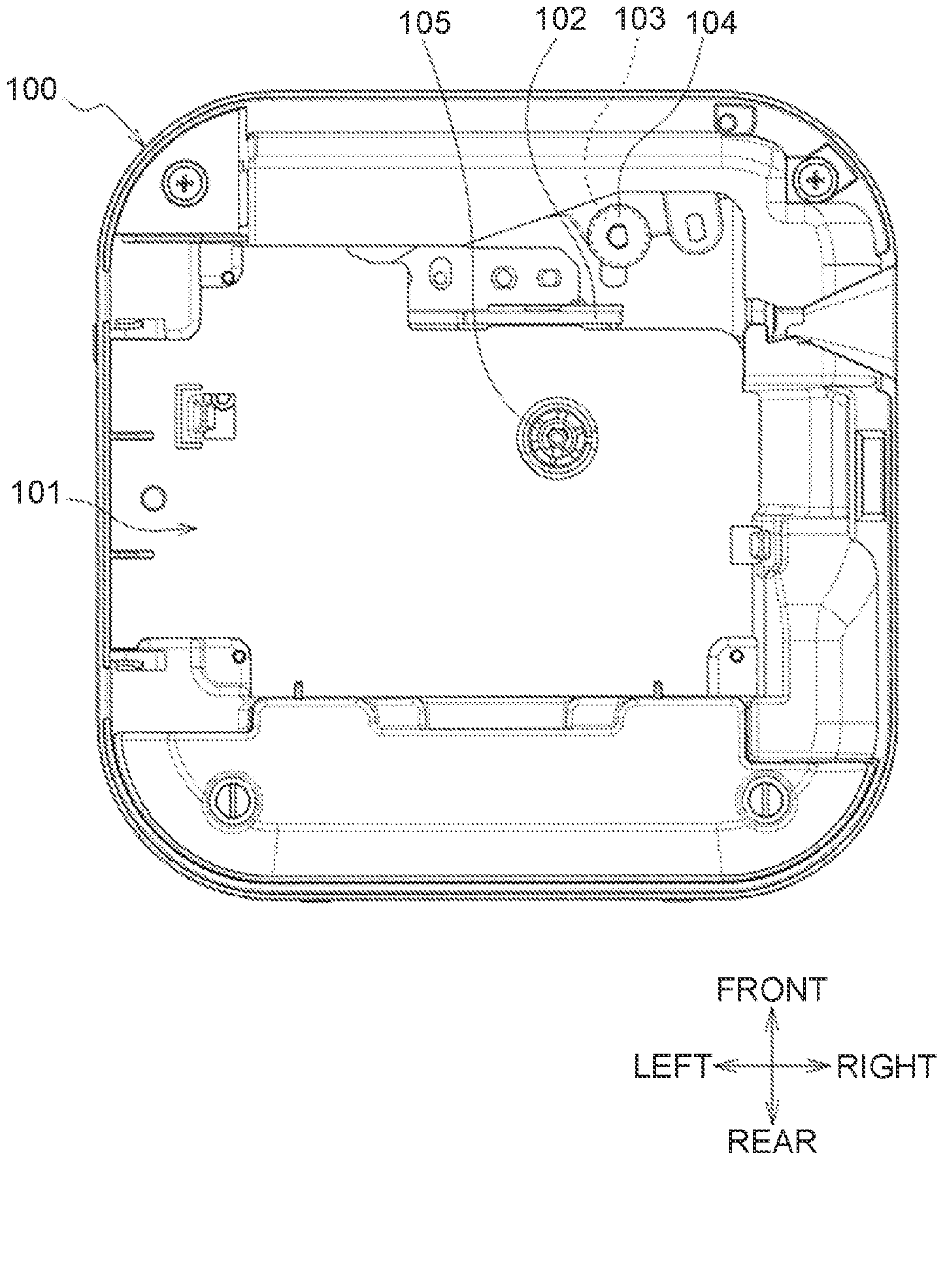
FIG. 8 is a schematic plan view of the printing apparatus main body in the printing apparatus of FIG. 1A.

The platen gear 104 is coupled to the platen roller 103 and engages the output gear 18. The platen roller 103 and the platen gear 104 are swingable between a position illustrated in FIG. 8 where they are separated from the print cassette 10 and a position illustrated in FIG. 9 where the platen gear 104 engages the output gear 18.

The drive shaft 105 is inserted into the input spool 16 and engages the input gear 19 to rotate the input spool 16 and the input gear 19.

Figure 9:
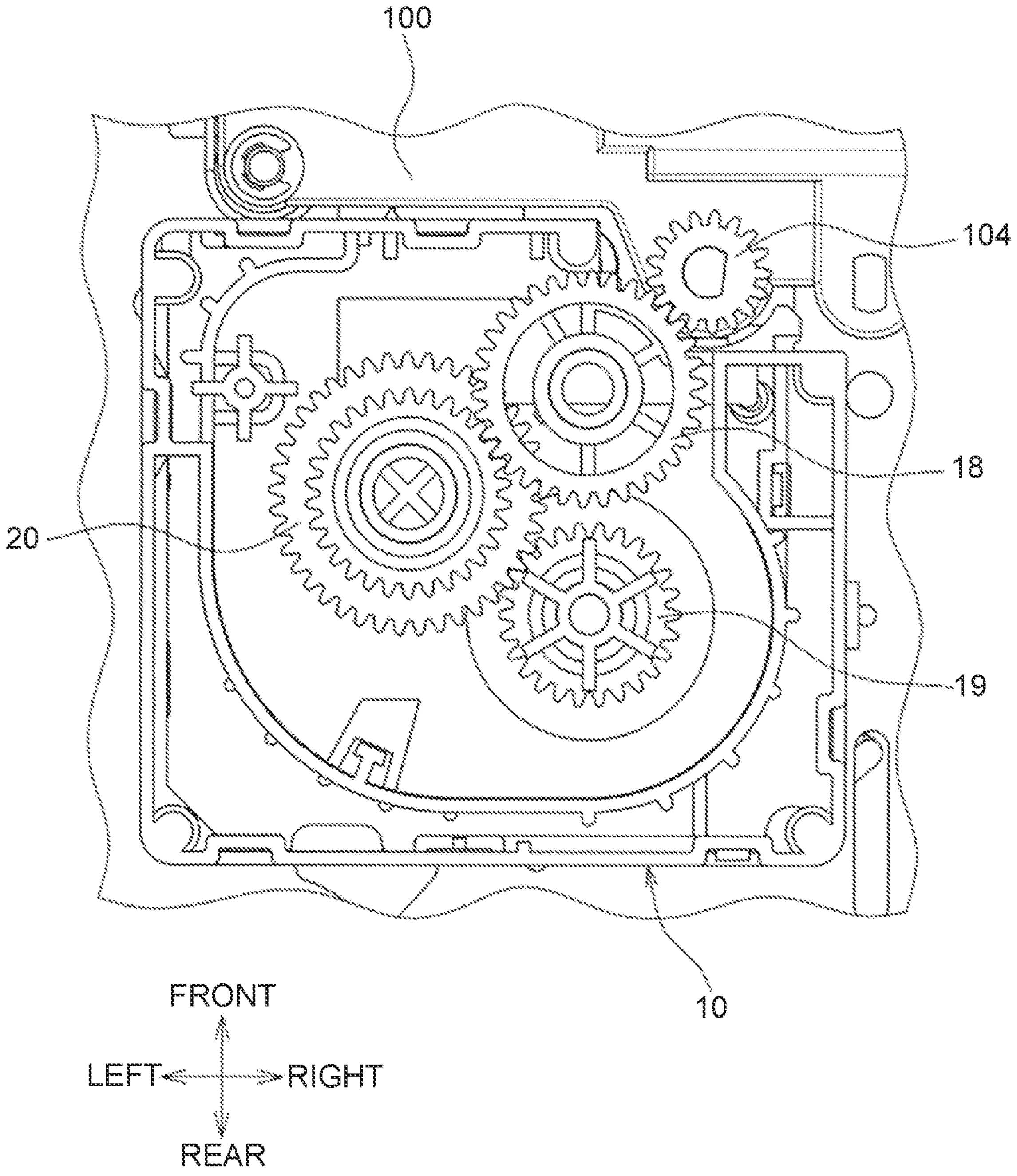
FIG. 9 is a schematic view illustrating an engagement state of an output gear and a platen gear in the printing apparatus of FIG. 1A.

As illustrated in FIG. 9, in a state where the print cassette 10 is attached to the printing apparatus main body 100, the drive shaft 105 engages the input gear 19, and the platen gear 104 engages the output gear 18. Specifically, the drive shaft 105 is inserted into the input spool 16 and the input gear 19 of the print cassette 10. Thereafter, the platen roller 103 and the platen gear 104 are swung toward the head opening 33B of the print cassette 10.

When the drive shaft 105 rotates the input gear 19 in a state where the print cassette 10 is attached, the output gear 18 is rotated, the platen gear 104 rotates with the rotation of the output gear 18, and the platen roller 103 rotates with the rotation of the platen gear 104.

[1-2. Effects]

According to the embodiment described above in detail, the following effects are obtained.

(1a) The second supply spool 15, the output gear 18, and the first roll 11 are disposed in order of the second supply spool 15, the output gear 18, and the first roll 11 in the axial direction of the rotation axis L5 of the second supply spool 15.

The print cassette 10 of the present embodiment is assumed to be relatively frequently replaced, in the printing apparatus 1, with one of various types of print cassettes 10 each storing a different type of tape having a different color, shape, or the like. For this reason, a print cassette 10 may be dropped when replaced.

In contrast, even when the print cassette 10 is dropped and collides with something like a floor surface, due to the arrangement of the second supply spool 15, the output gear 18, and the first roll 11 described above, a portion of the print cassette 10 in the up-down direction closer to the second supply spool 15 or the first roll 11 may be highly likely to collide with the floor surface earlier than the output gear 18. Therefore, the probability of the output gear 18 colliding with the floor surface can be reduced. As a result, damage to the output gear 18 is reduced when a surface perpendicular to the axial direction of the rotation axis L5 of the second supply spool 15 collides with something like a floor surface.

(1b) The above-described arrangement facilitates alignment of the output gear 18 in the axial direction of the rotational axis L5 of the second supply spool 15 when the print cassette 10 is attached to the printing apparatus main body 100. This reduces a failure in engaging the output gear 18 and the platen gear 104.

(1c) With the above-described arrangement, the first tape 11A and the ink ribbon 14A can be spaced from each other inside the print cassette 10. This reduces interference between components of the first tape 11A and components of the ink ribbon 14A.

(1d) In the above-described arrangement, since the rotation axis L7 of the output gear 18 and the rotation axis L8 of the input gear 19 are misaligned with each other, the design flexibility of the print cassette 10 increases.

(1e) With the above-described arrangement, interference between the output gear 18 and the conveyance passage of the first tape 11A in the head opening 33B can be avoided. This increases the design flexibility of the print cassette 10.

(1f) With the above-described arrangement, the output gear 18 is disposed more inward than the second supply spool 15 in the axial direction of the rotation axis L5, and thus the strength of the support portion (i.e., the first frame portion 32) of the output gear 18 can be increased.

(1g) Since the input spool 16, the input gear 19, and the first roll 11 are disposed in order of the input spool 16, the input gear 19, and the first roll 11 in the axial direction of the rotation axis L5 of the second supply spool 15, when the print cassette 10 is dropped and a surface perpendicular to the axial direction of the rotation axis L5 of the second supply spool 15 collides with something like a floor surface, damage to the input gear 19 is reduced.

(1h) The output gear 18, the cover portion 32B, and the first roll 11 are disposed in order of the output gear 18, the cover portion 32B, and the first roll 11 in the axial direction of the rotation axis L5 of the second supply spool 15. As described above, in the present embodiment, the print cassette 10 may be dropped, for example, when the print cassette 10 is replaced.

In contrast, even when the print cassette 10 falls, as the cover portion 32B is provided, the probability that the cover portion 32B, not the output gear 18, collides with something like a floor surface is increased. The output gear 18 is thus protected by the cover portion 32B, and damage to the output gear 18 is further reduced.

(1i) The idle gear 20 can reduce the rotation speed of the driving force of the drive shaft 105 to a rotation speed suitable for conveying the first tape 11A. Therefore, conveyance of the first tape 11A and supply of the ink ribbon 14A can be performed using a common drive source.

(1j) The first tape 11A is diagonally laid in the second region A2 in a direction intersecting the second direction, and is conveyed toward the discharge port 33C in a region of the first region A1 across the output gear 18 from the first roll 11 in the axial direction of the rotation axis L5 of the second supply spool 15. Thus, the print cassette 10 can be downsized.

2. Second Embodiment

[2-1. Configuration]

Figure 10A:
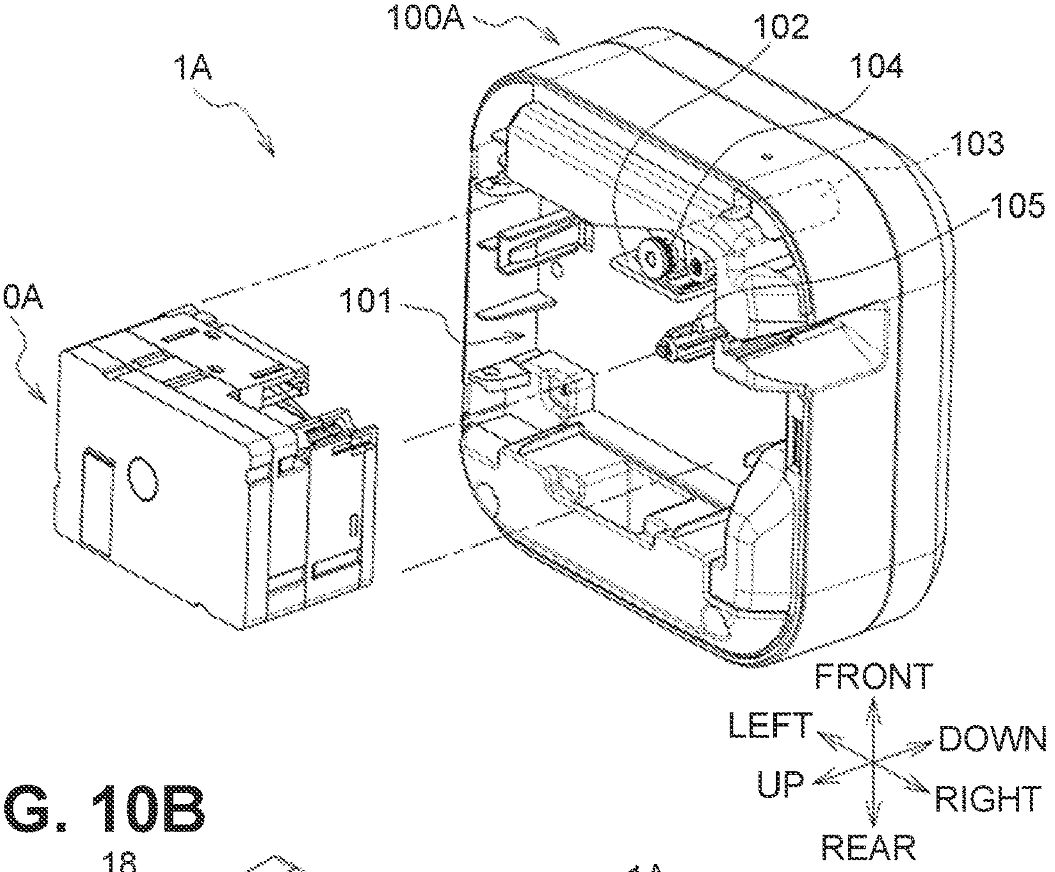
FIGS. 10A and 10B are schematic perspective views illustrating a state in which a print cassette is detached from a printing apparatus main body in a printing apparatus according to an embodiment different from FIG. 1A.
Figure 10B:
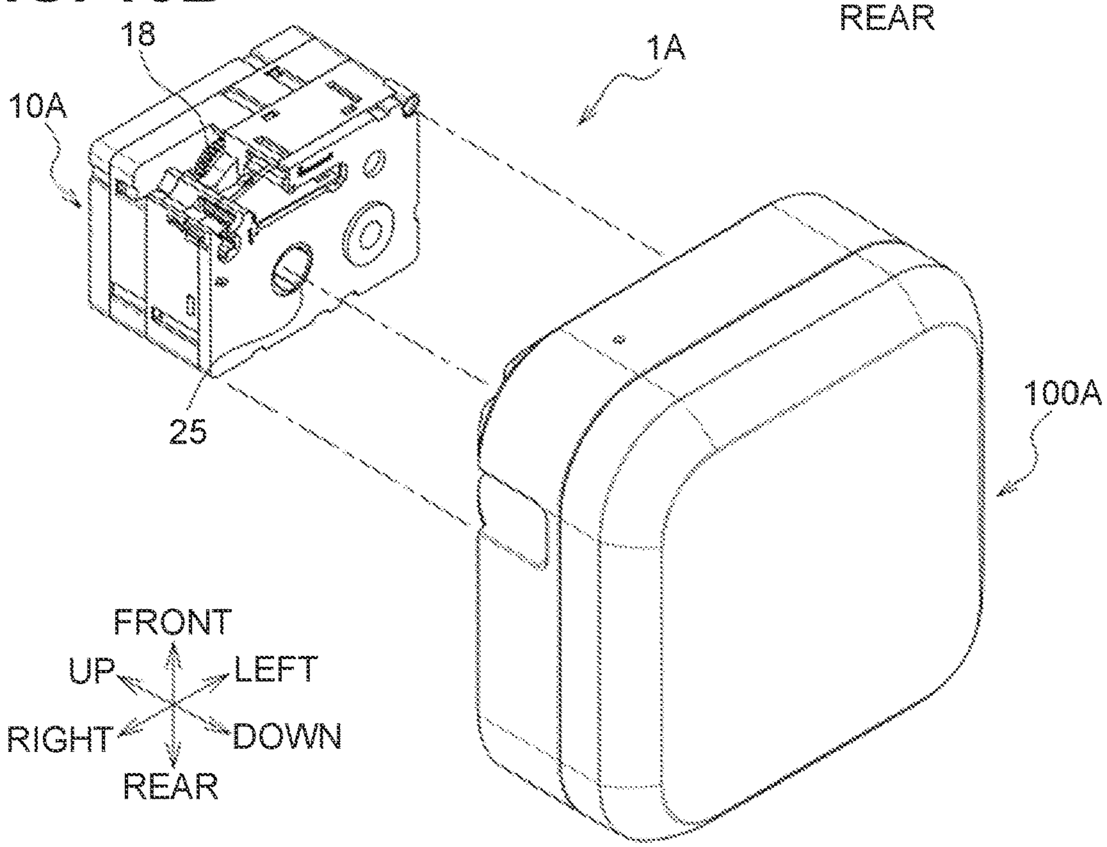

A printing apparatus IA illustrated in FIGS. 10A and 10B includes a print cassette 10A and a printing apparatus main body 100A.

<Print Cassette>

Figure 11:
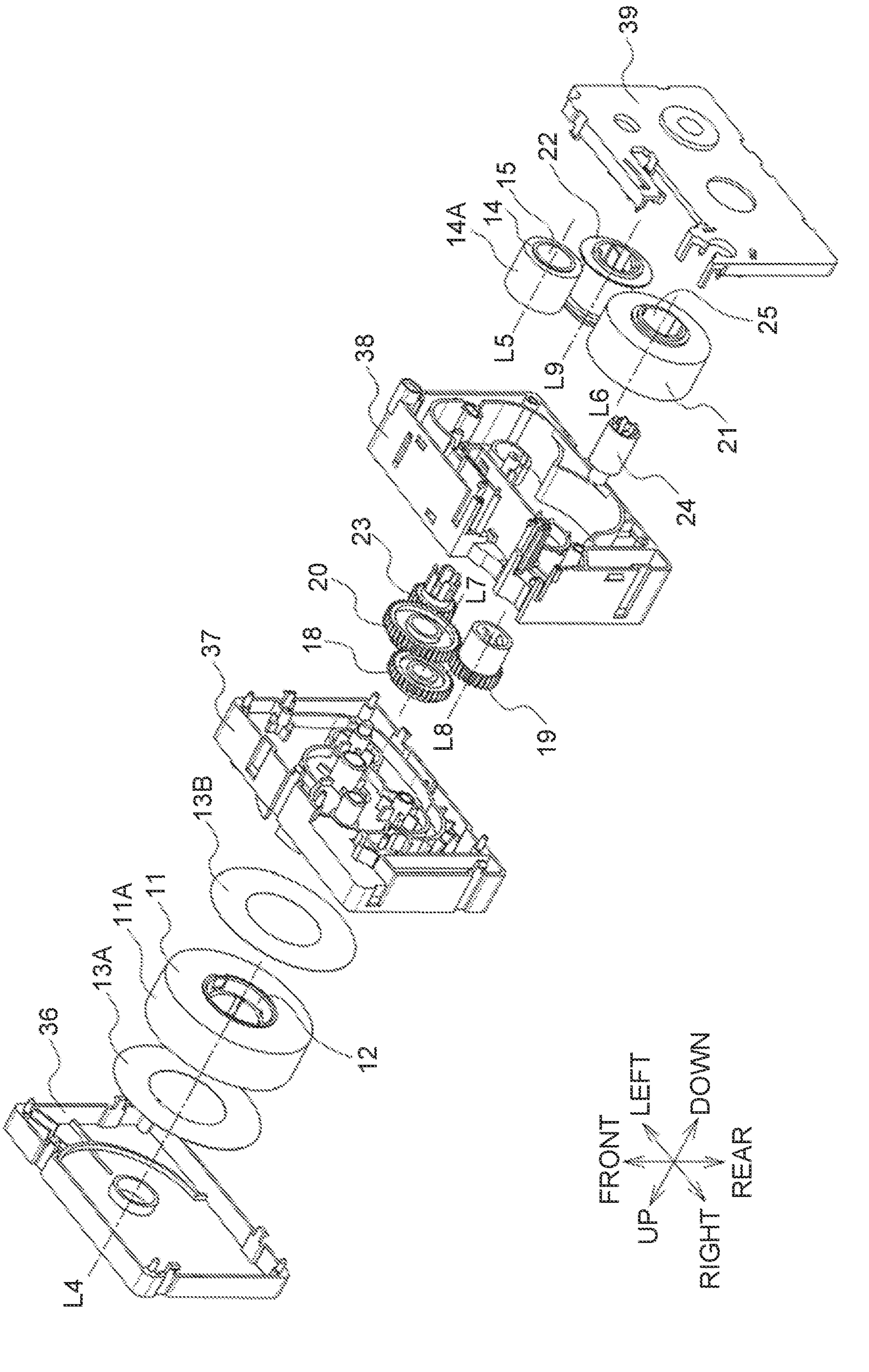
FIG. 11 is a schematic exploded perspective view of the print cassette in the printing apparatus of FIG. 10A.

In the print cassette 10A, a third roll 21, a take-up spool 22, a take-up gear 23, and a pinch roller 24 illustrated in FIG. 11 are added to the print cassette 10 of the first embodiment, and the input spool 16, the first lid portion 31, the first frame portion 32, the second frame portion 33, and the second lid portion 34 of the first embodiment are replaced with an input spool 25, a first lid portion 36, a first frame portion 37, a second frame portion 38, and a second lid portion 39.

The input spool 25 is similar to the input spool 16 except that it does not have spline teeth 16B. The first lid portion 36, the first frame portion 37, the second frame portion 38, and the second lid portion 39 are extended in the left-right direction more than the first lid portion 31, the first frame portion 32, the second frame portion 33, and the second lid portion 34, respectively. Other configurations of the print cassette 10A are similar to those of the print cassette 10 of the first embodiment except for the points described below, and thus description thereof will be omitted.

In the third roll 21, a laminate tape used for protecting the first tape 11A is wound around the input spool 25. The laminate tape has an adhesive surface to be bonded to the first tape 11A on which printing has been performed by the print head 102.

The take-up spool 22 is rotatable about a rotation axis L9. The rotation axis L9 of the take-up spool 22 is parallel to the rotation axis L5 of the second supply spool 15, that is, parallel to the up-down direction. The take-up spool 22 takes up the ink ribbon 14A by rotation of the take-up gear 23.

The take-up gear 23 is coupled to the take-up spool 22 and engaged with the idle gear 20. The take-up gear 23 is rotated by the driving force input to the input gear 19 to rotate the take-up spool 22.

The pinch roller 24 presses the laminate tape against the printed first tape 11A together with the pressing roller 106. The pinch roller 24 is disposed downstream of the head opening 33B in the conveyance direction of the first tape 11A.

<Printing Apparatus Main Body>

Figure 12:
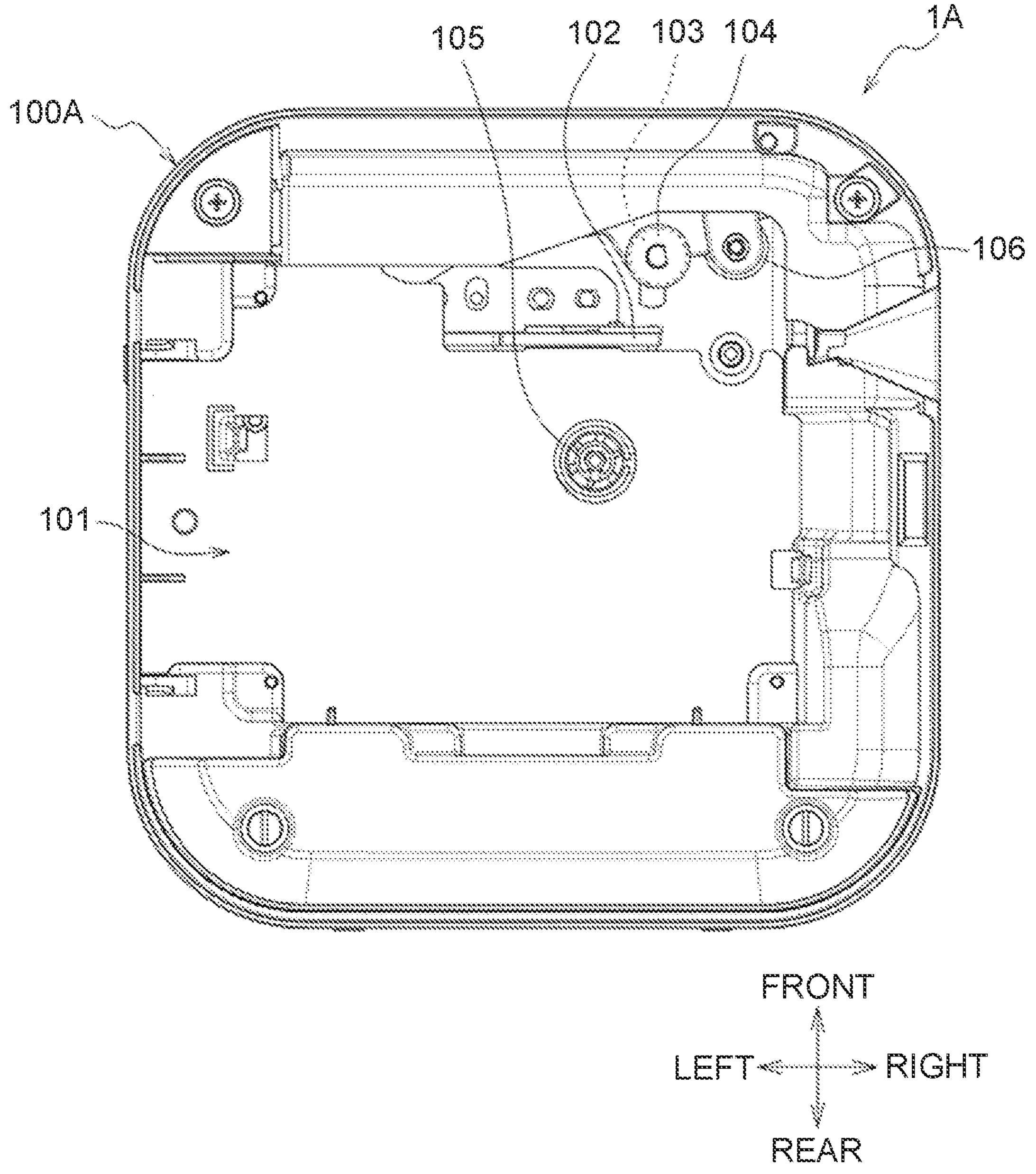
FIG. 12 is a schematic plan view of the printing apparatus main body in the printing apparatus of FIG. 10A.

In the printing apparatus main body 100A, a pressing roller 106 illustrated in FIG. 12 is added to the printing apparatus main body 100 of the first embodiment. Other configurations of the printing apparatus main body 100A are similar to those of the printing apparatus main body 100 of the first embodiment except for the points described below, and thus description thereof will be omitted.

Figure 13:
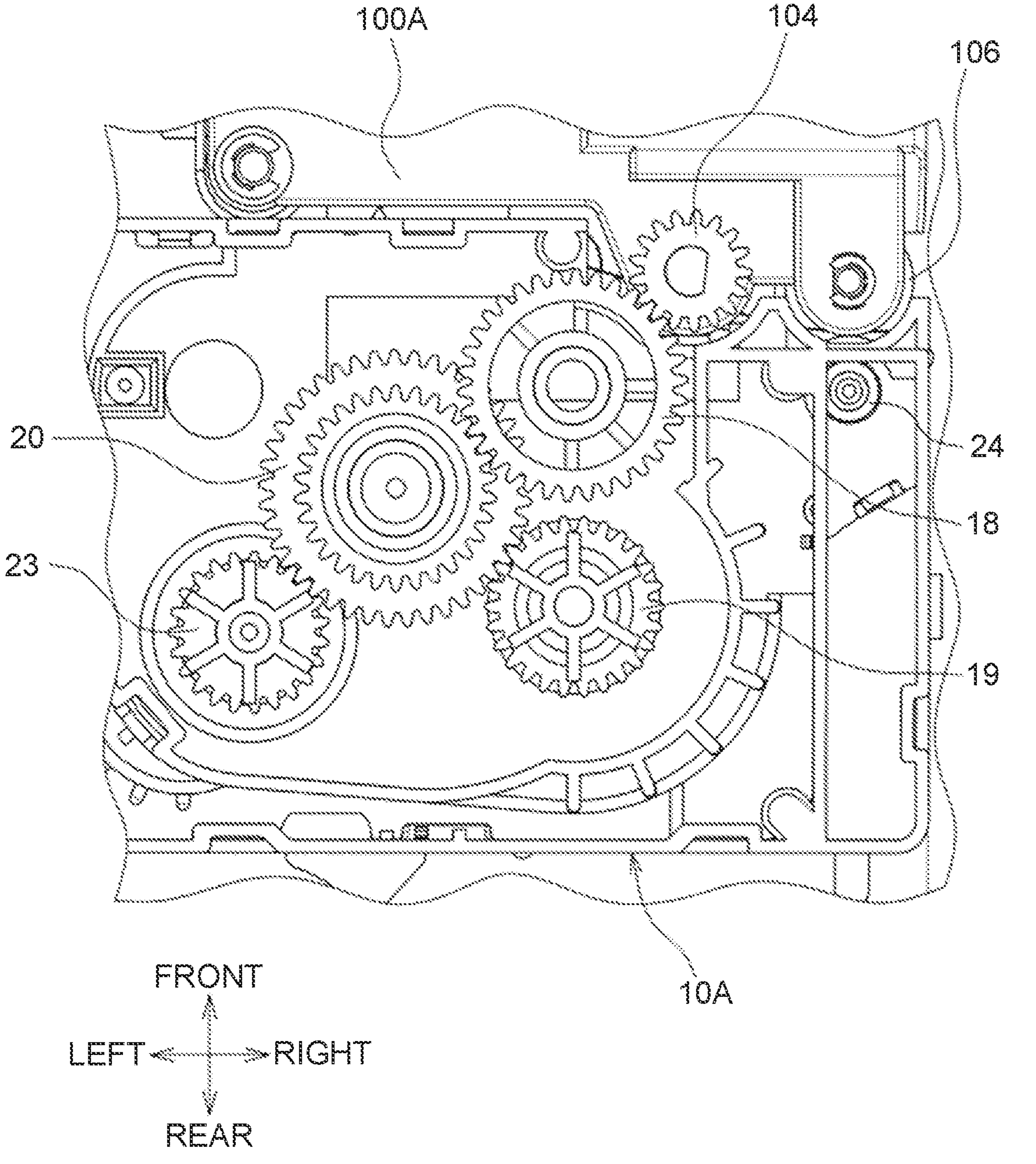
FIG. 13 is a schematic view illustrating an engagement state of an output gear and a platen gear in the printing apparatus of FIG. 10A.

The pressing roller 106 is configured to be swingable together with the platen roller 103 and the platen gear 104. The pressing roller 106 is swingable between a position illustrated in FIG. 12 where it is separated from the print cassette 10A and a position illustrated in FIG. 13 where it presses the first tape 11A and the laminate tape together with the pinch roller 24.

[2-2. Effects]

According to the embodiment described above in detail, the following effects are obtained.

(2a) The printed content on the first tape 11A can be protected by the laminate tape while having the same advantages as those of the first embodiment.

3. Other Embodiments

Although the embodiments of the present disclosure have been described above, it is needless to say that the present disclosure is not limited to the above-described embodiments and can take various forms.

(3a) The printing apparatus of each embodiment described above is not limited to an apparatus that performs printing using an ink ribbon as a second tape. The printing apparatus may use a band-shaped thermal paper instead of the first tape in the first embodiment, and may use a laminate tape (i.e., a protective tape) instead of the ink ribbon.

In addition, the printing apparatus may use, as the first tape, a stencil tape on which a printing pattern is perforated by a thermal head, and may use, as the second tape, a band-shaped slip sheet that protects and supports the stencil tape. In this case, in the head opening, the first tape may be superimposed on the second tape at a position closer to the print head than the second tape (i.e., as an upper layer), or the first tape may be superimposed on the second tape at a position farther from the print head than the second tape (i.e., as a lower layer).

(3b) The print cassette according to each embodiment described above may have two or more idle gears. Further, the transmission mechanism that engages the input gear and the output gear does not necessarily include a speed reduction mechanism. That is, the idle gear does not necessarily have to be a stepped gear and may be a single spur gear. Further, the print cassette may have a transmission mechanism other than a gear. Further, the print cassette may not have the transmission mechanism itself, and the output gear may directly engage the input gear.

(3c) In the print cassette of each embodiment described above, the conveyance passage of the first tape is an example. Therefore, the first tape does not necessarily need to be diagonally laid in the second region in a direction intersecting the second direction. The direction in which the first tape is discharged may be other than the second direction.

(3d) The print cassette according to the second embodiment may include a third supply spool around which a laminate tape is wound, instead of the take-up spool. In the print cassette according to the second embodiment, the input spool may be used as a take-up spool for an ink ribbon.

(3e) The functions of one component in each embodiment described above may be distributed as a plurality of components, or the functions of a plurality of components may be integrated into one component. Further, a portion of the configuration of each embodiment described above may be omitted. In addition, at least a portion of the configuration of each embodiment described above may be added to or replaced with another configuration thereof. It should be noted that all aspects included in the technical idea specified by the wording described in the claims are embodiments of the present disclosure.

What is claimed is:

1. A print cassette, comprising:
a roll of a first tape;
a supply spool rotatable about a rotation axis;
an ink ribbon being wound around the supply spool; and
an output gear to output a driving force to an outside of the print cassette,
wherein the supply spool, the output gear, and the roll are disposed in order of the supply spool, the output gear, and the roll in an axial direction of the rotation axis of the supply spool.

2. A printing apparatus comprising:
a printing apparatus main body; and
the print cassette according to claim 1,
wherein the print cassette is attachable to and detachable from the printing apparatus main body, the print cassette further including:
an input spool rotatable about a rotation axis; and
an input gear directly or indirectly engaging the output gear to transmit the driving force to the output gear,
wherein a rotation axis of the input gear is located collinearly with the rotation axis of the input spool,
wherein the input spool, the input gear, and the roll are disposed in order of the input spool, the input gear, and the roll in an axial direction of the rotation axis of the supply spool,
wherein the printing apparatus main body includes:
a print head to print on the first tape;
a platen roller to convey the first tape;
a platen gear coupled to the platen roller to engage the output gear; and
a drive shaft to engage the input gear when inserted in the input spool to rotate the input spool and the input gear, and
wherein, in a state where the print cassette is attached to the printing apparatus main body, the drive shaft engages the input gear and the platen gear engages the output gear, when the drive shaft rotates the input gear, the output gear is rotated, the platen gear rotates with rotation of the output gear, and the platen roller rotates with rotation of the platen gear.

3. The print cassette according to claim 1, further comprising a case in which at least a portion of the roll, at least a portion of the supply spool, at least a portion of the ink ribbon, and at least a portion of the output gear are disposed.

4. The print cassette according to claim 3,
wherein the case has a cover portion disposed at a position overlapping the output gear in the axial direction of the rotation axis of the supply spool, and
wherein the output gear, the cover portion, and the roll are disposed in order of the output gear, the cover portion, and the roll in the axial direction of the rotation axis of the supply spool.

5. The print cassette according to claim 1, further comprising:
an input spool rotatable about a rotation axis; and
an input gear directly or indirectly engaging the output gear to transmit the driving force to the output gear,
wherein a rotation axis of the input gear is located collinearly with the rotation axis of the input spool,
wherein the input spool, the input gear, and the roll are disposed in the order of the input spool, the input gear, and the roll in the axial direction of the rotation axis of the supply spool.

6. The print cassette according to claim 5,
wherein the input spool is cylindrical,
wherein the input spool has an inner peripheral surface defining a hollow portion,
wherein the inner peripheral surface of the input spool is provided with spline teeth, and
wherein the rotation axis of the input gear overlaps the hollow portion in a direction of the rotation axis of the input spool.

7. The print cassette according to claim 5,
wherein at least a portion of the input gear is located at a position overlapping the roll in the axial direction of the rotation axis of the supply spool.

8. The print cassette according to claim 5, further comprising a transmission mechanism to engage the input gear and the output gear and transmit a driving force input to the input gear to the output gear.

9. The print cassette according to claim 8, wherein the transmission mechanism has an idle gear.

10. The print cassette according to claim 8, wherein the transmission mechanism includes a speed reduction mechanism.

11. The print cassette according to claim 10, wherein the transmission mechanism has a stepped gear in which a plurality of gears are disposed coaxially.

12. The print cassette according to claim 9, wherein the idle gear engages the output gear, and wherein the idle gear is a stepped gear in which a plurality of gears are disposed coaxially.

13. The print cassette according to claim 4, wherein the output gear has a first side surface and a second side surface, wherein the first side surface is located at a position closer to the roll than the second side surface is in the axial direction of the rotation axis of the supply spool, and wherein an entire region of the first side surface overlaps the cover portion in the axial direction of the rotation axis of the supply spool.

14. The print cassette according to claim 1, wherein at least a portion of a second roll of the ink ribbon wound around the supply spool is located at a position overlapping the roll in the axial direction of the rotation axis of the supply spool.

15. The print cassette according to claim 1, wherein the output gear is a single gear.

16. The print cassette according to claim 3, wherein the case has a first case portion to house the roll, a second case portion to house the supply spool, and a passage to convey the first tape constituting the roll from the first case portion to the second case portion, and wherein the second case portion has a discharge port from which the first tape is discharged outside.

17. The print cassette according to claim 16, wherein the case further has a third case portion located between the first case portion and the second case portion, and wherein at least a portion of the output gear is located in the third case portion.

18. The print cassette according to claim 11, wherein the stepped gear has a first gear and a second gear having a diameter smaller than that of the first gear, and wherein the second gear is disposed at a position closer to the roll than the first gear is in the axial direction of the rotation axis of the supply spool.

19. The print cassette according to claim 16, wherein the output gear is disposed in a first region of the case in a first direction perpendicular to the axial direction of the rotation axis of the supply spool, wherein the first tape is diagonally laid in a direction intersecting a second direction perpendicular to the axial direction of the rotation axis of the supply spool, in a second region of the case different from the first region in the first direction, and wherein the first tape is conveyed in the second direction toward the discharge portion in a region of the first region across the output gear from the roll in the axial direction of the rotation axis of the supply spool.

20. The print cassette according to claim 1, further comprising:

an input spool rotatable about a rotation axis; and an input gear directly or indirectly engaging the output gear to transmit the driving force to the output gear, wherein a rotation axis of the input gear is located collinearly with the rotation axis of the input spool, wherein the input spool, the input gear, and the roll are disposed in order of the input spool, the input gear, and the roll in an axial direction of the rotation axis of the supply spool, wherein the print cassette is attachable to and detachable from a printing apparatus main body, wherein the printing apparatus main body includes:

a print head to print on the first tape;

a platen roller to convey the first tape;

a platen gear coupled to the platen roller to engage the output gear; and a drive shaft to engage the input gear when inserted in the input spool to rotate the input spool and the input gear, and wherein, in a state where the print cassette is attached to the printing apparatus main body, the drive shaft engages the input gear and the platen gear engages the output gear, when the drive shaft rotates the input gear, the output gear is rotated, the platen gear rotates with rotation of the output gear, and the platen roller rotates with rotation of the platen gear.

21. A print cassette, comprising:

a roll of a first tape;

an output gear rotatable about a rotation axis to output a driving force to an outside of the print cassette; and a case in which at least a portion of the roll and at least a portion of the output gear are located, the case having an exit through which the first tape pulled out from the roll is discharged from the print cassette, wherein the exit, the output gear, and the roll are disposed in order of the exit, the output gear, and the roll in an axial direction of the rotation axis of the output gear.

* * * * *